(No Model.)
W. E. DOUBLEDAY.
MACHINE FOR BEATING UP THE NAP OF FUR FACED ARTICLES.
No. 253,161. Patented Jan. 31, 1882.
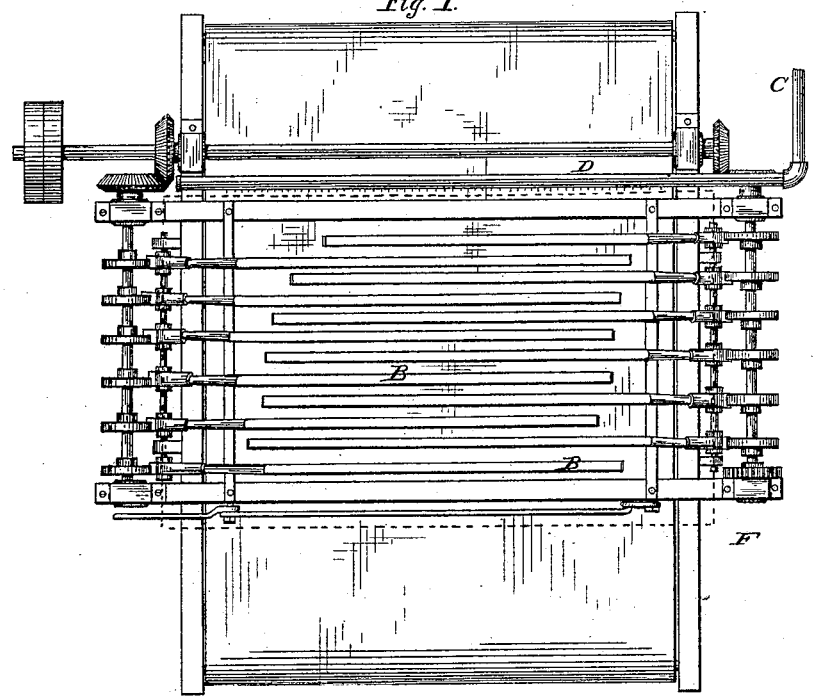
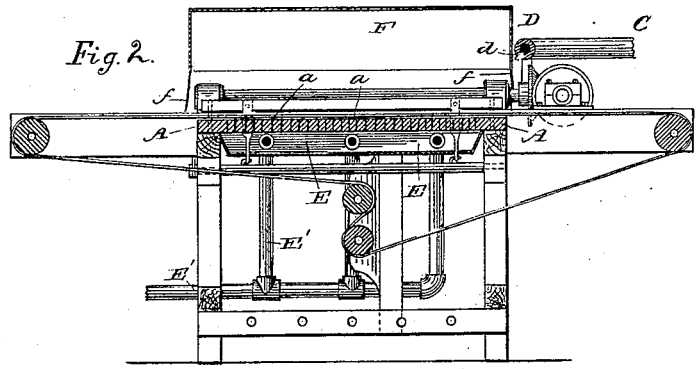
Attest:
J. C. Turner
J. S. Barker.
Inventor:
William E. Doubleday
by Doubleday & Bliss
atty
N. PETERS. Photo-Lithographer. Washington, D. C.

UNITED STATES PATENT OFFICE.

WILLIAM E. DOUBLEDAY, OF NEW YORK, N. Y., ASSIGNOR TO ELLEN M. DOUBLEDAY, OF SAME PLACE.

MACHINE FOR BEATING UP THE NAP OF FUR-FACED ARTICLES.

SPECIFICATION forming part of Letters Patent No. 253,161, dated January 31, 1882.

Application filed December 9, 1881. (No model.)

To all whom it may concern:

Be it known that I, WILLIAM E. DOUBLEDAY, a citizen of the United States, residing at New York, in the county of New York and State of New York, have invented certain new and useful Improvements in Machines for Beating up the Nap of Fur-Faced Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the manufacture of that class of goods in which a layer or covering of fur, either close or flowing, is stuck to a suitable body or base of woven or felted fabric which is composed either in whole or in part of wool, fur, or other animal fiber, such as will permit the fur coating or surface of fur to be firmly united to it.

In carrying out my invention I propose to use any of the well-known mechanisms now employed for whipping or beating similar goods, preferably that shown in Letters Patent No. 208,502, adding thereto appliances by means of which to discharge upon the material, during the operation of whipping, water (preferably hot) either in the form of jets or a spray; or under some circumstances I propose to apply steam to the material being acted upon by the whippers, in which case I prefer to introduce the steam through the bed-plate, finely perforated for that purpose; and in this instance I prefer to inclose the apparatus, or so much of it as may be necessary, in a chamber which should have throats upon opposite sides to permit the passage of the material to be whipped into and out of said chamber. By preference I provide such throats with flexible curtains or their equivalents, adapted to engage with the passing sheet of material, so as to prevent the escape of steam at the throats.

Figure 1 is a top or plan view of the machine which I propose to use, and Fig. 2 is a vertical section of the same.

In the drawings, A is the bed-plate; B B, the whippers of the machine shown in Patent No. 208,502; C D, a water-pipe, the part D of which extends horizontally and transversely across the sheet of fur-faced material, and is provided with small apertures $d$, through which there may be discharged, either continuously or intermittently, a supply of hot water directly upon the fur which is being whipped. The bed-plate A may be provided with small openings $a\ a$.

E is a steam-chamber below the bed-plate, into which steam is introduced through a pipe, E', and passes thence through the openings $a$ and into and through the fabric, its facing of fur, and the superimposed backing or layer of cotton fiber, when such is used.

The chamber F, with its curtains $f$, retains the steam in contact with the material and the whipping mechanism.

G is a feeding-belt, passing around the rollers H I K L, to which motion is imparted by a train of gearing connecting said rollers with the cam-shaft M, which actuates the whippers.

In order to facilitate the passage of the steam through the belt, I prefer to make it of some coarsely-woven fabric having interstices of such size as will permit a free passage of the steam. When preferred, however, I may use hot air, instead of steam, either with or without the water-supply which I have described; but in practice I prefer to employ steam.

I do not wish to be limited to the use of the machine which I have described, because I may use any of those which are commonly employed for similar purposes without departing from the spirit of my invention.

Of course the steam passing through the bed-plate and coming in contact with the cold material to be whipped will be condensed to such an extent as to moisten it, and thus facilitate the operation of the whippers, the result being that the superfluous fur and the cotton backing (when used) are readily detached, leaving the fur in a desirable flowing condition when the same has not been too long under the action of a jigger.

I am aware that in beating-up machines a combination of a traveling apron, whippers, and means for wetting the fur-faced article with hot water has been used. Hence I do not claim such construction broadly.

What I claim is—

1. In a machine for whipping or beating fur-faced articles, the combination of a stationary bed, a traveling apron above the bed, whippers, and means for imparting moisture to the fur-faced fabric, substantially as set forth.

2. In a machine for whipping or beating fur-faced fabrics, the combination of perforated stationary bed, a traveling apron above the bed, whippers, and means for passing a heated current through the perforated bed, substantially as set forth.

3. In a machine for whipping or beating fur-faced fabrics, the combination of a stationary bed, a traveling apron above the bed, whippers, means for imparting moisture to the fur-faced fabric, and means for passing heated currents upward through the perforated bed, substantially as set forth.

4. In a machine for whipping or beating fur-faced fabric, a support for the fabric to be beaten, whippers, an inclosing-chamber above the support for the fur-faced fabric, and means for imparting moisture to the material, substantially as set forth.

5. In a machine for whipping and beating fur-faced fabric, a support for the fabric to be beaten, whippers, an inclosing-chamber above the support for the fur-faced fabric, and means for imparting moisture and heat to the material, substantially as set forth.

6. In a machine for whipping or beating fur-faced fabrics, the combination, with the traveling apron and the whippers, of the water-pipe C D, substantially as set forth.

In testimony whereof I affix my signature in presence of two witnesses.

WILLIAM E. DOUBLEDAY.

Witnesses:
   H. H. DOUBLEDAY,
   CHARLES TAPPAN.